(12) United States Patent
Mraz et al.

(10) Patent No.: US 10,218,586 B2
(45) Date of Patent: Feb. 26, 2019

(54) SYSTEM AND METHOD FOR ENABLING THE CAPTURE AND SECURING OF DYNAMICALLY SELECTED DIGITAL INFORMATION

(71) Applicant: Owl Computing Technologies, Inc., Ridgefield, CT (US)

(72) Inventors: Ronald Mraz, South Salem, NY (US); Gabriel Silberman, Hastings on Hudson, NY (US)

(73) Assignee: Owl Cyber Defense Solutions, LLC, Danbury, CT (US)

( * ) Notice: Subject to any disclaimer, the term of this patent is extended or adjusted under 35 U.S.C. 154(b) by 1319 days.

(21) Appl. No.: 13/748,147

(22) Filed: Jan. 23, 2013

(65) Prior Publication Data

US 2014/0207939 A1    Jul. 24, 2014

(51) Int. Cl.
*H04L 29/06* (2006.01)
*H04L 12/26* (2006.01)

(52) U.S. Cl.
CPC ............ *H04L 43/00* (2013.01); *H04L 63/306* (2013.01); *H04L 63/0428* (2013.01); *H04L 63/308* (2013.01)

(58) Field of Classification Search
CPC ................................ H04L 12/46; H04L 12/28
USPC .................................................. 709/224, 223
See application file for complete search history.

(56) References Cited

U.S. PATENT DOCUMENTS

| 5,638,446 | A | 6/1997 | Rubin |
| 5,703,562 | A | 12/1997 | Nilsen |
| 5,745,679 | A | 4/1998 | Mercer |
| 5,995,982 | A | 11/1999 | Mercer |
| 6,151,708 | A | 11/2000 | Pedrizetti et al. |

(Continued)

FOREIGN PATENT DOCUMENTS

| EP | 20457520 A2 | 8/2009 |
| EP | 2430548 A1 | 11/2010 |

(Continued)

OTHER PUBLICATIONS

UK Intellectual Property Office, Examination Report under Section18(3), Jul. 17, 2014.

(Continued)

*Primary Examiner* — Adnan M Mirza
(74) *Attorney, Agent, or Firm* — Mandelbaum Siflin Economou LLP; John S. Economou

(57) ABSTRACT

A system is disclosed for monitoring a channel passing information which includes an identifying designation. A channel monitor is coupled to the channel and configured to provide on an output all information passing on the channel. A manifest engine is coupled to the channel monitor to receive the information passing on the channel and to an operator console to receive an information manifest table. The information manifest table contains at least one identifying designation. The manifest engine compares the information received with the information in the information manifest table and only provides on the output that information having an identifying designation that matches an identifying designation included within the information manifest table. A storage server is coupled to the manifest engine and configured to receive and store the information provided from the manifest engine.

14 Claims, 5 Drawing Sheets

(56) References Cited

U.S. PATENT DOCUMENTS

| | | |
|---|---|---|
| 6,381,742 B2 | 4/2002 | Forbes et al. |
| 6,430,608 B1 | 8/2002 | Shaio |
| 6,694,434 B1 | 2/2004 | McGee et al. |
| 6,789,255 B1 | 9/2004 | Pedrizetti et al. |
| 6,883,168 B1 | 4/2005 | James et al. |
| 6,944,634 B2 | 9/2005 | Herding et al. |
| 6,970,866 B1 | 11/2005 | Pravetz et al. |
| 7,089,248 B1 | 8/2006 | King et al. |
| 7,092,972 B2 | 8/2006 | Kashyap |
| 7,263,528 B2 | 8/2007 | Haff et al. |
| 7,280,956 B2 | 10/2007 | Cross et al. |
| 7,310,629 B1 | 12/2007 | Mendelson et al. |
| 7,373,345 B2 | 5/2008 | Carpentier et al. |
| 7,386,574 B2 | 6/2008 | Abe et al. |
| 7,472,272 B2 | 12/2008 | Stamos et al. |
| 7,483,958 B1 | 1/2009 | Elabbady et al. |
| 7,502,754 B2 | 3/2009 | Campbell et al. |
| 7,558,797 B2 | 7/2009 | Li |
| 7,610,355 B2 | 10/2009 | Azuma et al. |
| 7,668,868 B1 | 2/2010 | King et al. |
| 7,707,424 B2 | 4/2010 | Axelsson |
| 7,756,826 B2 | 7/2010 | Bots et al. |
| 7,765,411 B2 | 7/2010 | Hennessey et al. |
| 7,805,468 B2 | 9/2010 | Takashi |
| 7,814,551 B2 | 10/2010 | Darweesh et al. |
| 7,865,575 B2 | 1/2011 | Leitheiser |
| 7,874,015 B2 | 1/2011 | Aaron |
| 7,930,538 B1 | 4/2011 | Israel et al. |
| 7,934,091 B2 | 4/2011 | Stamos et al. |
| 8,010,680 B2 | 8/2011 | Crawford |
| 7,992,209 B1 | 9/2011 | Menoher et al. |
| 8,024,306 B2 | 9/2011 | Palliyil et al. |
| 8,024,462 B1 | 9/2011 | Zhu et al. |
| 8,041,946 B2 | 10/2011 | Bunn et al. |
| 8,069,349 B1 | 11/2011 | Israel et al. |
| 8,075,403 B2 | 12/2011 | O'Brien et al. |
| 8,103,870 B2 | 1/2012 | Clower et al. |
| 8,161,104 B2 | 4/2012 | Tomkow |
| 8,176,331 B2 | 5/2012 | Moreillon et al. |
| 8,191,165 B2 | 5/2012 | Aaron |
| 8,196,201 B2 | 6/2012 | Repasi et al. |
| 8,234,350 B1 | 7/2012 | Gu et al. |
| 8,250,235 B2 | 8/2012 | Harvey et al. |
| 8,352,450 B1 * | 1/2013 | Mraz et al. ............. 707/705 |
| 2004/0133548 A1 | 7/2004 | Fielding et al. |
| 2009/0271858 A1 * | 10/2009 | Cooke et al. ............. 726/12 |
| 2010/0246549 A1 * | 9/2010 | Zhang ............. H04W 74/0816 370/338 |
| 2012/0030768 A1 | 2/2012 | Mraz et al. |

FOREIGN PATENT DOCUMENTS

| | | |
|---|---|---|
| WO | WO2005085971 A1 | 9/2005 |
| WO | WO20100132647 A1 | 11/2010 |
| WO | WO2012012266 A1 | 1/2012 |

OTHER PUBLICATIONS

UK Intellectual Property Office, Combined Search and Examination Report under Sections 17 & 18(3), Dec. 23, 2013 (includes Search Report under Section 17 dated Dec. 20, 2013).

* cited by examiner

SYSTEM AND METHOD FOR ENABLING THE CAPTURE AND SECURING OF DYNAMICALLY SELECTED DIGITAL INFORMATION

FIELD OF INVENTION

The present invention relates generally to the selective capture of specific digital information from among a collection of such information based on programmable selection criteria, and securing the captured information. More particularly, the present invention relates to the use of manifest tables and one-way, hardware-enforced information transfers, to select the information to be captured and secured.

BACKGROUND OF THE INVENTION

In today's connected world it is common to use shared conduits for transmitting and receiving information, including wire lines, optical connections and wireless spectra. The information flowing through these channels may include digital messages and files, voice, images and video, and other digital and analog information transferred among individuals, computer systems, and other devices, including those with embedded computers.

There are a variety of scenarios requiring the capture of information meeting specific criteria flowing through a shared channel and storing it in a secure environment, while having no visibility to any other channel traffic. These may range, for example, from lawful intercepts of various types of communications, to ongoing status and specific event notifications emanating from surgically-implanted devices, either directly or through a mediating device. It is common in these scenarios to find legal and/or regulatory requirements imposing restrictions on the information capturing apparatus to only record information meeting specific criteria (e.g., a conversation from a given phone number, or data tagged with a specific implanted device's identification). Further requirements may dictate the captured information must be secured to preserve its integrity and that of the process, and/or protect the privacy of individuals or other entities. Furthermore, the specific criteria for selecting the information to be captured may vary over time.

A configuration such as the one shown in FIG. 1 physically enforces one-way data transfer at both ends of the optical fiber connecting the send platform 101 to the receive platform 102, thereby creating a truly unidirectional data transfer link between the source network 104 and the destination network 105. One-way data transfer systems based on a one-way data link are designed to transfer data or information in only one direction, making it physically impossible to transfer any kind of data, such as handshaking protocols, error messages, or busy signals, in the reverse direction. Such physically imposed unidirectionality in data flow cannot be hacked by a programmer, as is often done with firewalls, where unidirectional rules are software-protected (e.g., password authentication, etc.). Accordingly, the one-way data transfer system based on a one-way data link ensures that data residing on the isolated destination secure computer or network is maximally protected from any undesired and unauthorized disclosure. Alternatively, the source network is isolated from any malware contained in the destination network.

As described in U.S. Pat. No. 8,352,450, issued on Jan. 8, 2013, the contents of which are incorporated herein by reference, files based on various conventional transport protocols may be transferred across a one-way data link under suitable arrangements. The following example illustrates transfer of files based on the Transmission Control Protocol (TCP) across a one-way data link. FIG. 2 is a functional block diagram that schematically illustrates implementation of a TCP-based secure file transfer across a single one-way data link in a one-way data transfer system 200.

Construction of the conventional TCP sockets requires bilateral communications since it requires an acknowledgement channel from the receive node to the send node. Accordingly, the conventional TCP/IP protocol cannot be implemented directly in a one-way data transfer system based on a one-way data link, since no bilateral "hand shaking" is allowed over the one-way link due to physical enforcement of unidirectionality of data flow. Instead, the one-way data transfer system 200 illustrated in FIG. 2 uses a TCP simulation application called TCP proxy, which is preferably a TCP/IP socket-based proxy software, but may also be hardware-based or based on a suitable combination of software and hardware, to simulate the TCP/IP protocol across the one-way data link 207.

In FIG. 2, a TCP server proxy 205 fully implements the TCP/IP protocol in its bilateral communications 203 with the upstream TCP file client 202 residing in a source platform 201. The TCP server proxy 205 may reside within the send node 204 as shown in FIG. 2, or alternatively, may be separate from but coupled to the send node 204. After the TCP server proxy 205 receives files from the TCP file client 202, the send node 204 sends the files through its interface 206 to the one-way data link 207. After the receive node 208 receives the files through its interface 209 from the one-way data link 207, the TCP client proxy 210 communicates under the full implementation of the TCP/IP protocol with a TCP file server 213 residing in a destination platform 212 and forwards the received files to the TCP file server 213. The TCP client proxy 210 may reside within the receive node 208 as shown in FIG. 2, or alternatively, may be separate from but coupled to the receive node 208.

In certain situations, it would be advantageous to use a one-way data link with an independent link layer protocol for one-way transfer so that non-routable point to point communications with a true IP protocol break can be enforced. With these properties, data packets or files cannot be accidentally routed in the network and other protocols (such as printer protocols, etc.) will not route across the one-way data link. An exemplary configuration enforcing such non-routable point to point communications with a true IP protocol break can be implemented in the one-way file transfer system 200 of FIG. 2. The TCP-based file transfer system 200 may be configured to prohibit transmission of IP information across the one-way data link 207. When the TCP server proxy 205 receives a file from the TCP file client 202, it removes the IP information normally carried in the file data packet headers under the TCP/IP protocol and replaces it with pre-assigned point-to-point channel numbers, so that no IP information is sent across the one-way data link 207. Instead, predetermined IP routes may be defined at the time of the configuration of the system 200 in the form of channel mapping tables residing in the TCP server proxy 205 associated with the send node 204 and the TCP client proxy 210 associated with the receive node 208. The send node 204 then sends the files with the pre-assigned channel numbers to the receive node 208 through its interface 206 across the one-way data link 207, which are received by the receive node 208 through its interface 209.

Upon receipt of the files, the TCP client proxy 210 then maps the channel numbers from the received files to the corresponding predetermined IP address of a destination platform 212, to which the files are forwarded.

For the security of the overall one-way file transfer system 200, the IP address-to-channel number mapping table residing in the send node 204 may be different from the channel number-to-IP addressing mapping table residing in the receive node 208, and furthermore, neither table may be re-constructed on the basis of the other table. Neither table alone reveals the overall IP routing configuration from the source platform 201 to the destination platform 212. In this way, the IP information of the destination platform 212 may remain undisclosed to the sender at the source platform 201 and the security of the overall system 200 can be maintained.

Under the conventional TCP/IP protocol, the acknowledgement mechanism requiring bilateral communications may provide means for error detection. However, the one-way data link 207 forecloses such means. Instead, the one-way data transfer system 200 may assure file integrity by applying, for example, a hash algorithm such as MD5 to each file being transferred over the one-way data link 207. The send node 204 calculates an MD5 hash number for the file and sends the resulting hash number along with the file to the receive node 208 over the one-way data link 207. When the receive node 208 receives the file, it may re-calculate a hash number for the received file and compare the result with the hash number calculated by the send node 204. By comparing these results, the receive node 208 may be able to determine as to whether any error has occurred during the file transfer across the one-way data link.

It is an object of the present invention to provide a secure method for the selective capture of information flowing on a shared channel and securing it to comply with legal and regulatory requirements or security and operational guidelines, while ignoring all other information on the shared channel.

SUMMARY OF THE INVENTION

The present invention provides a system for monitoring a channel passing information that includes an identifying designation. The system includes a channel monitor having an input coupled to the information channel and an output and is configured to provide on the output all information passing on the information channel. The system also includes a manifest engine having a first input coupled to the output of the channel monitor to receive the information passing on the information channel, a second input configured to receive an information manifest table and an output. The information manifest table has at least one identifying designation. The manifest engine is configured to compare information received on the first input with the information in the information manifest table and to provide on the output only that information having an identifying designation that matches an identifying designation included within the information manifest table. Finally, the system includes a storage server coupled to the output of the manifest engine and configured to receive and store information provided on the output of the manifest engine. The system may also include an operator console coupled to the second input of the manifest engine which is configured to output the information manifest table to the manifest engine.

In one embodiment, the manifest engine includes a manifest engine TX server having a first input coupled to the first input of the manifest engine, a second input coupled to the second input of the manifest engine, and an output. The manifest engine TX server is configured to receive the information passing on the information channel and the information manifest table and to compare the information received on the first input with the information in the information manifest table and to provide on the output of the manifest engine TX server only that information having an identifying designation that matches an identifying designation included within the information manifest table. This embodiment also includes a data link having an input coupled to the output of the manifest engine TX server and an output. Finally, this embodiment includes a manifest engine RX server having an input coupled to the output of the data link and an output coupled to the output of the manifest engine. The manifest engine RX server is configured to receive information on the input of the manifest engine RX server and pass the received information to the output of the manifest engine RX server. In a further variation, the data link is a one-way data link in which data may only pass from the input to the output.

In an alternative embodiment, the manifest engine includes a manifest engine TX server having an input coupled to the input of the manifest engine and an output. The manifest engine TX server is configured in this embodiment to receive information on the input of the manifest engine TX server and pass the received information to the output of the manifest engine TX server. This alternative embodiment also includes a data link having an input coupled to the output of the manifest engine TX server and an output. Finally, this alternative embodiment includes a manifest engine RX server having a first input coupled to the output of the data link, a second input coupled to the second input of the manifest engine, and an output coupled to the output of the manifest engine. Here, the manifest engine RX server is configured to receive information on the input of the manifest engine RX server and the information manifest table and to compare the received information with the information in the information manifest table and to provide on the output of the manifest engine RX server only that information having an identifying designation that matches an identifying designation included within the information manifest table. In a further variation, the data link is a one-way data link in which data may only pass from the input to the output.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

In the present disclosure, like reference numbers refer to like elements throughout the drawings, which illustrate various exemplary embodiments of the present invention.

The present invention is directed to a system and apparatus for monitoring a shared information channel. For the purposes of this disclosure, "shared information channel" is broadly construed to include any type of information channel, wired or wireless, upon which information may pass, so long as such information includes a designation (of any sort) which provides an identification of such information. In one example, the information may be broadcast wirelessly, e.g., from a medical device implanted in a patient or from a computer or other device having a wireless communication interface. In another example, the information may be transmitted using wired connections on a local area network, a wide area network or a broadband (e.g., Internet) network with communications on, e.g., Ethernet cables, a coaxial cable network, a digital subscriber network. Similarly, the present invention may also monitor other types of digital network communications on an optical fiber network or on a wireless satellite network. In a further example, the information may be telephone call information included within a digital portion of the public switched telephone network (PSTN). As one of ordinary skill in the art will readily recognize, there is a wide spectrum of communication channels which can be monitored using the system and apparatus disclosed herein, and the examples presented above should not be considered limiting in any way.

Figure 1:
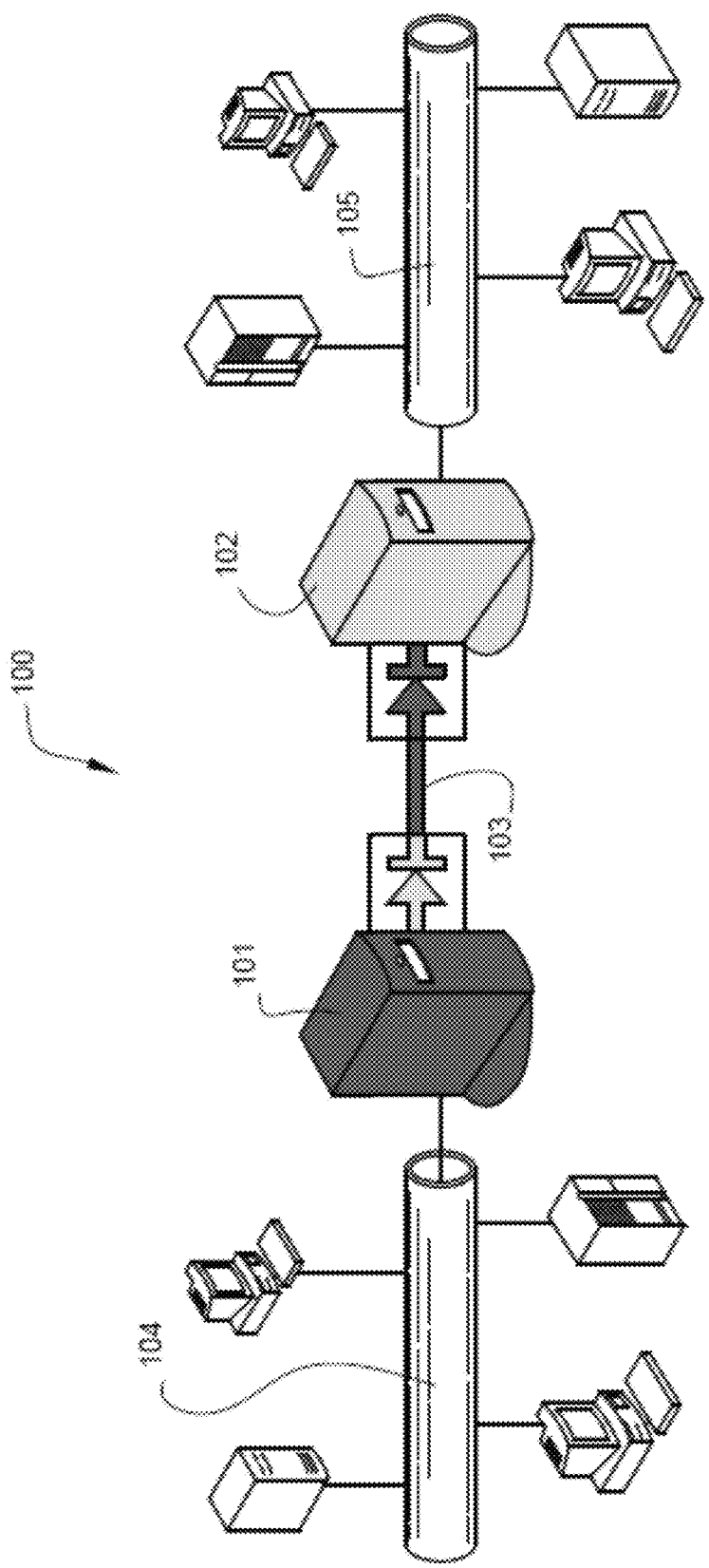
FIG. 1 is a block diagram of a conventional one-way data transfer system.
Figure 2:
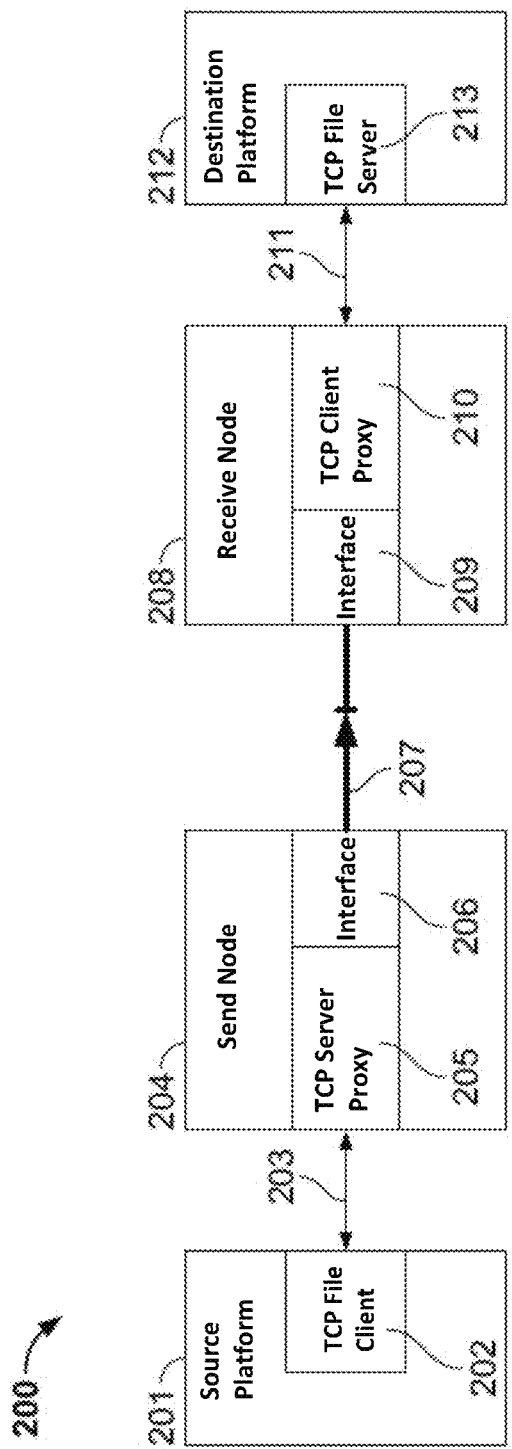
FIG. 2 is a functional block diagram that schematically illustrates TCP-based file transfer across a one-way data link.
Figure 3:
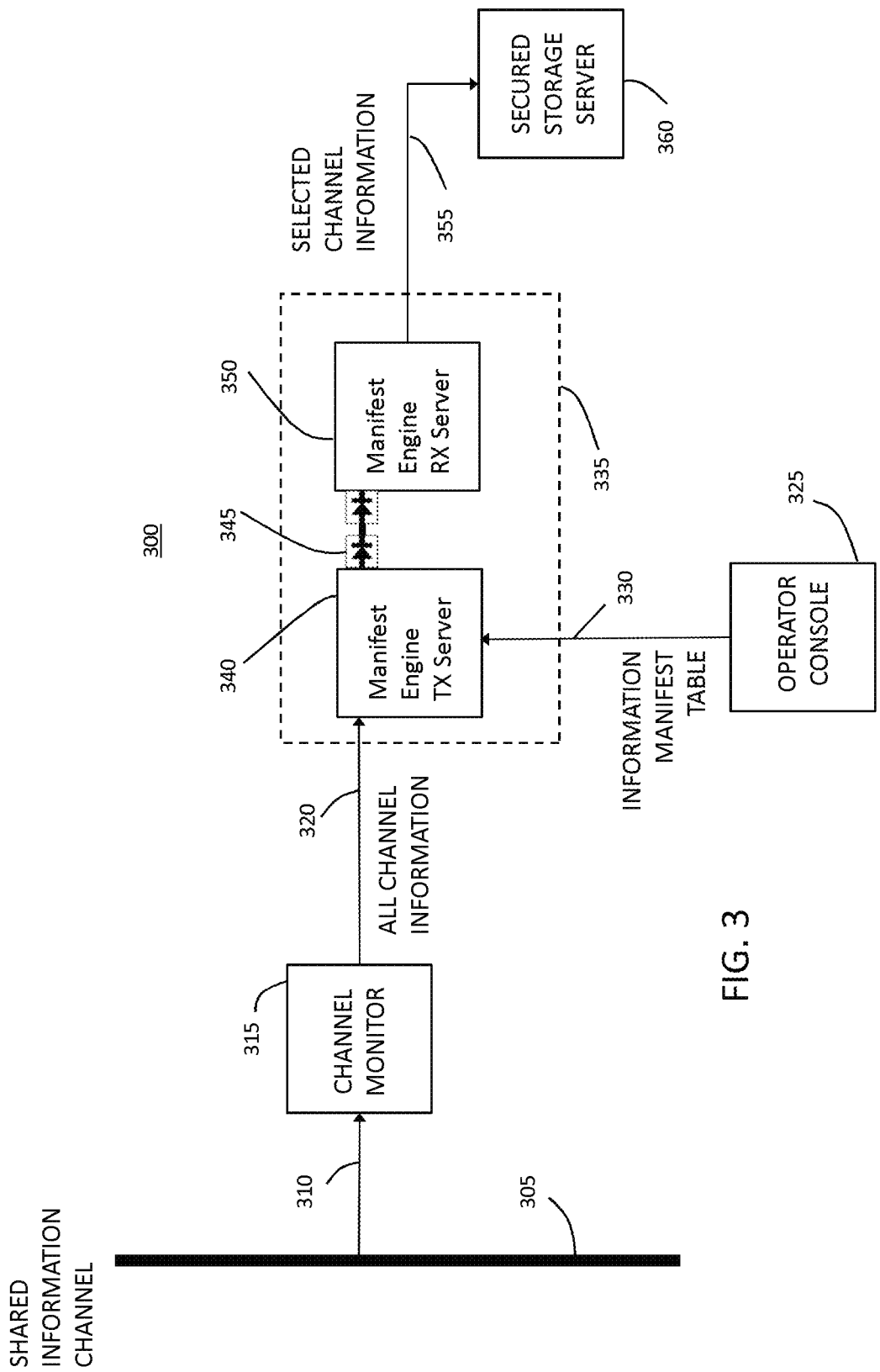
FIG. 3 is a block diagram of an exemplary embodiment of the present invention.

Referring now to the drawings and in particular to FIG. 3, a first presently preferred embodiment of the system 300 is shown. A shared information channel 305 is coupled to a channel monitor 315 via a tap 310. The tap 310 and the channel monitor 315 are conventional and depend upon the type of information channel to be monitored. In operation, channel monitor 315 provides an information stream along an output line 320 consisting of all communications occurring on the shared information channel 305. For example, if the shared information channel is a wireless network operating according to a particular standard, the channel tap 310 would be an antenna and the channel monitor 315 would be a wireless interface that operates according to that standard. Similarly, if the shared information channel is a wired local area network, the channel tap 310 would be a network connection (e.g., via a network switch) and the channel monitor 315 would be a conventional network interface controller (NIC).

The output line 320 of the channel monitor 315 is coupled to an input of the manifest engine 335. The manifest engine 335 includes a manifest engine TX server 340 having an output coupled to the input of an interface 345. Interface 345 is preferably a one-way interface. The output of the interface 345 is coupled to an input of a manifest engine RX server 350. An output of the manifest server RX server 350 (serving as the output of the manifest engine 335) is coupled to a storage device 360, e.g., a secured storage server, via a connection line 355. Storage device 360 may be part of a monitoring device or may be coupled to such monitoring device. Alternatively, storage device 360 may be part of a monitoring server which is configured to send any received information to one or more authorized monitoring clients coupled to the monitoring server. Preferably, the monitoring server may be configured to transmit the received information to the authorized monitoring clients either automatically or on demand. The manifest engine TX server 340 has a second input preferably coupled to an operator console 325 via a line 330. In an alternative embodiment, the second input may be coupled to a network connection to receive the information manifest table from a remotely coupled computer. As one of ordinary skill in the art will readily recognize, there are numerous other ways to provide the information manifest table to the manifest engine 335. The operator console 325 provides an information manifest table to the manifest engine TX server 340. The information manifest table consists of a list of information providing an identifying designation, each item on the list providing an identification of the information to be monitored. For example, the identifying designation may identify the particular source and/or destination of the associated information. For the purposes of this invention, the identifying designation may be any kind of information conventionally included within the transmitted information that may be used to identify such transmitted information. For certain applications, the identifying designation may be a tag specifically added to such information to provide identification thereof. In other applications, the identifying designation may be part of the information, e.g., metadata. In operation, manifest engine TX server 340 compares the identifying designation of each portion (block, file, etc.) of information received on line 320 with the information manifest table and only passes such portion to the one-way interface 345 when a match is found. Manifest engine RX server 350 receives the portions of information and forwards them to storage device 360 via connection line 355. In this way, only the particular information to be monitored (as identified by the associated identifying designation) is transmitted to the storage device 360.

In a further embodiment, the operator console 325 is configured to transmit the information manifest table to the manifest engine TX server 340 on fixed intervals, and the manifest engine TX server 340 is configured to discard each received information manifest table after a period of time corresponding to such interval. In the alternative, the information manifest table itself could also include an expiration time/date, and the manifest engine TX server 340 may be configured to use the current information manifest table until that date/time. This provides a great benefit, for example, when the present system is used in conjunction with a court-ordered wiretap that is only in place for a fixed interval of time because the system can be automatically programmed to record information only up to the expiration date/time.

The system and apparatus disclosed herein may be directly integrated into a sensing/monitoring device (e.g., a device for receiving information from an implanted medical device). In one alternative configuration, the system and apparatus may be placed between a monitored information channel and a monitoring device. In another alternative configuration, the system and apparatus may be placed at a static location, e.g., a phone exchange, an ISP facility, a hospital emergency room, a physician's office, a private home or on a mobile platform (such as mobile communication equipment, ambulances and other first responder vehicles).

The operator console 325 may be configured to add data to the information manifest table in a number of non-limiting alternative ways. For example, the operator console may be directly controlled by an onsite operator or remotely through an authenticated 3rd party. In some cases, e.g., when the system and apparatus is coupled to a phone exchange, the operator console can be configured to require particular documentation (e.g., a wiretapping court order). Alternatively, the operator console can be configured to require specific identification, such as patient name, patient identification number or some other code (e.g., a code included on medical emergency bracelet either by number or barcode).

Figure 4:
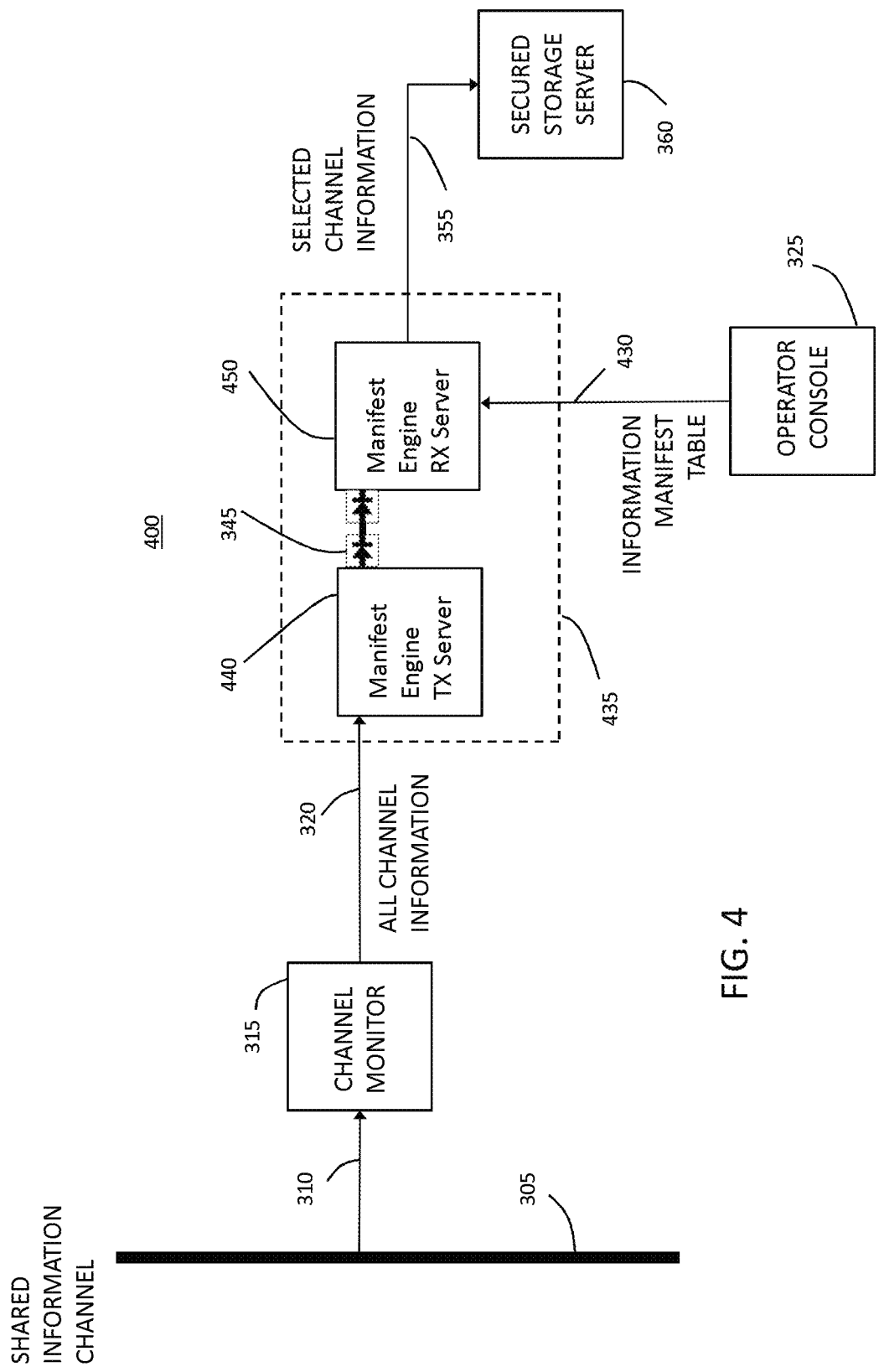
FIG. 4 is a block diagram of a first alternative exemplary embodiment of the present invention.

The system 300 shown in FIG. 3 provides the highest possible security for ensuring that only the selected channel information is provided to the secured storage server 360. In a first alternative embodiment of a system 400 shown in FIG. 4, a manifest engine 435 includes a manifest engine TX server 440 having an input coupled to output line 320 to receive and then pass all of the channel information over the one-way link 345. Manifest engine RX server 450 has an input coupled to the output of the link 345 (preferably a one-way link), a second input coupled to operator console 325 via a line 430 and an output coupled to connection line 355. As with the embodiment of FIG. 3, operator console 325 outputs an information manifest table, but here to the manifest engine RX server 450 which compares the identifying designation of each portion (block, file, etc.) of information received on one-way link 345 with the information manifest table and only passes such portion to storage device 360 via connection line 355 when a match is found. As with the embodiment of FIG. 3, only the particular information to be monitored (as identified by the associated identifying designation) is transmitted to the storage device 360. The embodiment of FIG. 4 may provide a lower latency and higher throughput than the embodiment of FIG. 3.

Figure 5:
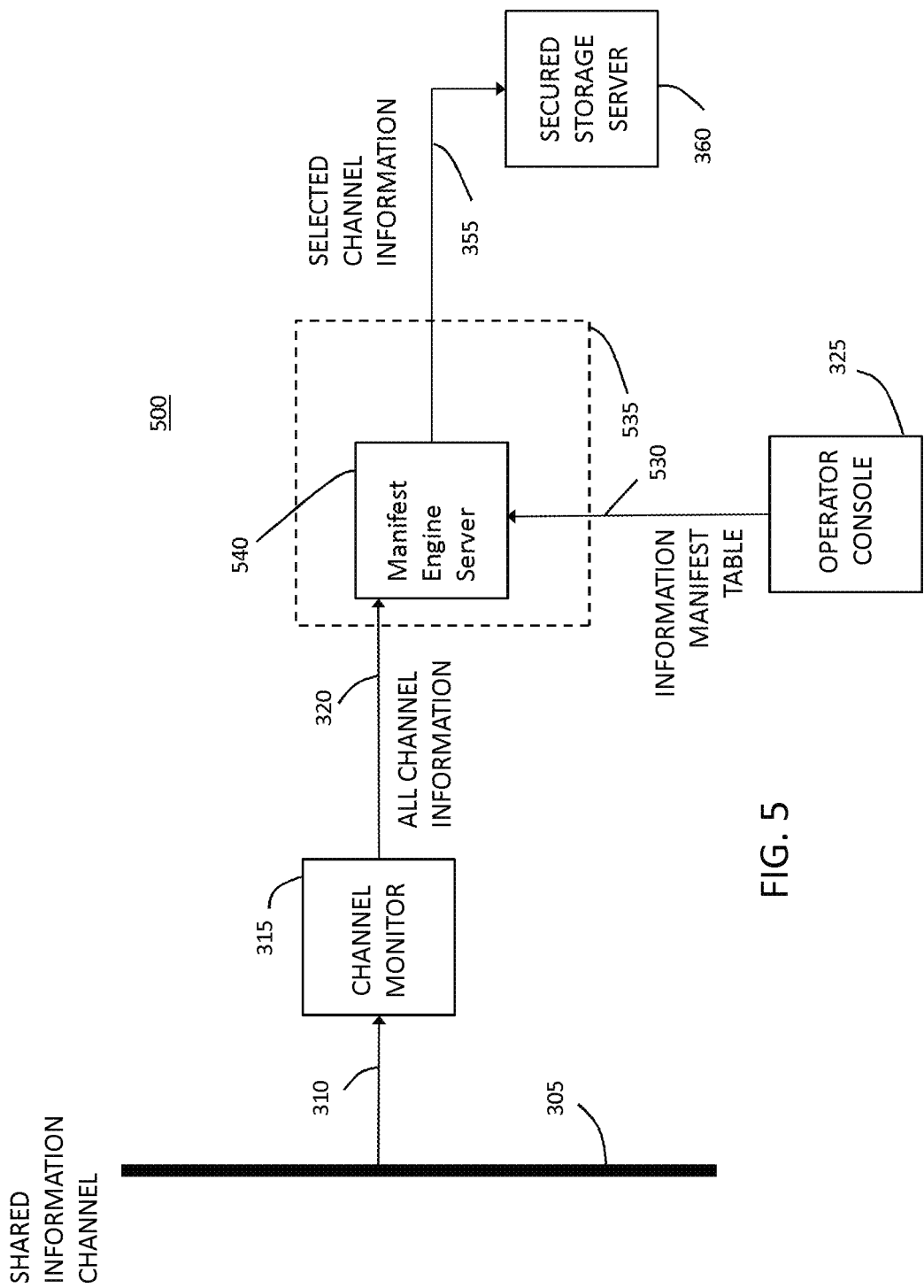
FIG. 5 is a block diagram of a second alternative exemplary embodiment of the present invention.

In a second alternative embodiment of a system 500 shown in FIG. 5, a manifest engine 535 includes a manifest engine server 540 having a first input coupled to output line 320 to receive all of the channel information, a second input coupled to operator console 325 via a line 530 and an output coupled to secured storage server 360 via connection line 355. As with the embodiments of FIGS. 3 and 4, operator console 325 outputs an information manifest table, but here to the manifest engine server 540, which compares the identifying designation of each portion (block, file, etc.) of information received on line 320 with the information manifest table and only passes such portion to storage device 360 via connection line 355 when a match is found. As with the embodiment of FIGS. 3 and 4, only the particular information to be monitored (as identified by the associated identifying designation) is transmitted to the storage device 360. The embodiment of FIG. 5 may provide a lower latency and higher throughput than the embodiments of FIGS. 3 and 4, but with somewhat less security than, in particular, FIG. 3.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A system for monitoring a channel passing information, the information including an identifying designation, comprising:
    a channel monitor having an input coupled to an information channel and an output, the channel monitor configured to provide on the output all information passing on the information channel, the information including an identifying designation;
    a manifest engine having a first input coupled to the output of the channel monitor to receive the information passing on the information channel, a second input configured to receive an information manifest table and an output, the information manifest table having at least one identifying designation, the manifest engine configured to compare information received on the first input with the at least one identifying designation in the information manifest table and to provide on the output only that information having an identifying designation that matches an identifying designation included within the information manifest table; and
    a storage server coupled to the output of the manifest engine and configured to receive and store information provided on the output of the manifest engine.

2. The system of claim 1, further comprising an operator console coupled to the second input of the manifest engine and configured to output the information manifest table to the manifest engine.

3. The system of claim 1, wherein the manifest engine comprises:
    a manifest engine TX server having a first input coupled to the first input of the manifest engine, a second input coupled to the second input of the manifest engine, and an output, the manifest engine TX server configured to receive the information passing on the information channel and the information manifest table and to compare the information received on the first input with the at lease identifying designation in the information manifest table and to provide on the output of the manifest engine TX server only that information having an identifying designation that matches an identifying designation included within the information manifest table;
    a data link having an input coupled to the output of the manifest engine TX server and an output; and
    a manifest engine RX server having an input coupled to the output of the data link and an output coupled to the output of the manifest engine, the manifest engine RX server configured to receive information on the input of the manifest engine RX server and pass the received information to the output of the manifest engine RX server.

4. The system of claim 3, wherein the data link is a one-way data link in which data may only pass from the input to the output.

5. The system of claim 1, wherein the manifest engine comprises:
    a manifest engine TX server having an input coupled to the input of the manifest engine and an output, the manifest engine TX server configured to receive information on the input of the manifest engine TX server and pass the received information to the output of the manifest engine TX server;
    a data link having an input coupled to the output of the manifest engine TX server and an output; and
    a manifest engine RX server having a first input coupled to the output of the data link, a second input coupled to the second input of the manifest engine, and an output coupled to the output of the manifest engine, the manifest engine RX server configured to receive information on the input of the manifest engine RX server and the information manifest table and to compare the received information with the information in the information manifest table and to provide on the output of the manifest engine RX server only that information having an identifying designation that matches an identifying designation included within the information manifest table.

6. The system of claim 5, wherein the data link is a one-way data link in which data may only pass from the input to the output; and wherein the storage server is only coupled to the channel passing information via the channel monitor and the manifest engine.

7. The system of claim 1, further comprising:

a server for sequentially outputting a series of information manifest tables, each information manifest table of the series including at least one identifying designation and being outputted at a predetermined fixed time interval after the output of the immediately preceding information manifest table of the series; and wherein the manifest engine is configured to receive and store each of the series of information manifest tables from the server, the manifest engine further configured to discard each file manifest table of the series of file manifest tables after the expiration of a period of time equal to the predetermined fixed interval so that only a single file manifest table is stored at any point in time.

8. The system of claim 1, further comprising:

a server for outputting an information manifest table, the information manifest table including at least one identifying designation and time information; and wherein the manifest engine is configured to receive and store the information manifest table from the server, the manifest engine further configured to discard the information manifest table after the expiration of a period of time equal to the time information.

9. A method for monitoring a channel passing information, the information including an identifying designation, comprising the steps of:

monitoring an information channel with a channel monitor coupled to the information channel and providing on an output of the channel monitor all information passing on the information channel, the information including an identifying designation;

receiving, from the output of the channel monitor and at a manifest engine, all information passing on the information channel;

receiving, at the manifest engine, an information manifest table having at least one identifying designation;

comparing, in the manifest engine, the received information with the at least one identifying designation in the information manifest table and identifying only that portion of the information having an identifying designation that matches an identifying designation included within the information manifest table; and outputting the identified information from the manifest engine to a storage server for storage thereon.

10. The method of claim 9, wherein the information manifest table is provided by an operator console coupled to the manifest engine.

11. The method of claim 9, further comprising the step of transferring the identified information across a one-way data link prior to performing the outputting step; and wherein the storage server is only coupled to the channel passing information via the channel monitor and the manifest engine.

12. The method of claim 9, further comprising the step of transferring the received information across a one-way data link prior to performing the comparing step; and wherein the storage server is only coupled to the channel passing information via the channel monitor and the manifest engine.

13. The system of claim 2, wherein:

the operator console is configured to sequentially output a series of information manifest tables, each information manifest table of the series including at least one identifying designation and being outputted at a predetermined fixed time interval after the output of the immediately preceding information manifest table of the series; and the manifest engine is configured to receive and store each of the series of information manifest tables from the operator console and to discard each information manifest table of the series of information manifest tables after the expiration of a period of time equal to the predetermined fixed interval so that only a single information manifest table is stored at any point in time.

14. The system of claim 2, wherein:

the operator console is configured to output an information manifest table including at least one identifying designation and time information; and the manifest engine is configured to receive and store the information manifest table from the operator console and to discard the information manifest table after a period of time equal to the time information.

* * * * *